(12) United States Patent
Kennedy

(10) Patent No.: US 6,756,693 B2
(45) Date of Patent: Jun. 29, 2004

(54) COMPACT AUXILIARY POWER GENERATOR

(76) Inventor: Gino W. Kennedy, 1743 Holly Oaks Lake Rd. West, Jacksonville, FL (US) 32225

( * ) Notice: Subject to any disclaimer, the term of this patent is extended or adjusted under 35 U.S.C. 154(b) by 128 days.

(21) Appl. No.: 09/945,186

(22) Filed: Aug. 31, 2001

(65) Prior Publication Data

US 2002/0030363 A1 Mar. 14, 2002

Related U.S. Application Data

(63) Continuation-in-part of application No. 09/603,725, filed on Jun. 23, 2000, now Pat. No. 6,677,684.

(51) Int. Cl.$^7$ ................................................ H02P 9/04
(52) U.S. Cl. ...................................................... 290/1 A
(58) Field of Search ................................. 290/1 A, 1 B, 290/1 R; 310/62, 63, 89; 296/37.6, 37.5, 37.14, 31.2, 146, 31.15, 149; 280/164.1; 165/41

(56) References Cited

U.S. PATENT DOCUMENTS

| | | | |
|---|---|---|---|
| 2,662,988 A | | 12/1953 | McKim ........................ 310/91 |
| 2,789,234 A | * | 4/1957 | Lambert et al. ............. 290/1 R |
| 4,074,786 A | * | 2/1978 | Joubert ....................... 180/68.5 |
| 4,441,684 A | | 4/1984 | Credle, Jr. .................... 248/674 |
| 4,548,164 A | * | 10/1985 | Ylonen et al. ................. 123/2 |
| 4,728,017 A | * | 3/1988 | Mullican ..................... 224/404 |
| 4,733,750 A | * | 3/1988 | Poirier et al. ................ 181/202 |
| 4,871,922 A | * | 10/1989 | Heinrich et al. ............ 290/1 B |
| 5,188,414 A | * | 2/1993 | Burnham et al. ........... 296/37.6 |
| 5,333,678 A | * | 8/1994 | Mellum et al. ................ 165/42 |
| 5,593,167 A | * | 1/1997 | Barnhardt et al. ........ 280/164.1 |
| 5,765,805 A | * | 6/1998 | Kennedy ..................... 248/674 |
| 5,964,492 A | * | 10/1999 | Lyon .......................... 296/37.6 |
| 6,099,070 A | * | 8/2000 | Yocum ........................ 296/183 |
| 6,340,191 B1 | * | 1/2002 | Brady ........................ 296/37.6 |

FOREIGN PATENT DOCUMENTS

JP 11-148348 * 6/1999

* cited by examiner

Primary Examiner—Nicholas Ponomarenko
Assistant Examiner—Julio C. Gonzalez
(74) Attorney, Agent, or Firm—McHale & Slavin, P.A.

(57) ABSTRACT

A low profile generator mount for large vehicles, such as tractor trailer combinations, utilizes the space below the door of the cab. The mount is an enclosure connected to the frame and housing a compact diesel engine and generator combination with the exterior of the mount capable of being in the form of steps for ingress into the cab, or formed to assimilate a conventional truck mounted storage box.

19 Claims, 4 Drawing Sheets

COMPACT AUXILIARY POWER GENERATOR

RELATED APPLICATION

This invention is a continuation-in-part of application Ser. No. 09/603,725 filed Jun. 23, 2000, now U.S. Pat. No. 6,677,684 the content of which is incorporated herein by reference.

FIELD OF THE INVENTION

This invention relates to auxiliary power generators and, in particular, to a compact auxiliary power generator having a generator assembly coupled directly to a diesel engine for use in mobile applications, such as large trucks.

BACKGROUND OF THE INVENTION

Semi-truck tractor trailers frequently employ the use of an auxiliary generator to meet electrical requirements when the main engine is not running. Tractor trailers having a "bunk" or "sleeper" cab area are common and most interstate fuel stations permit the drivers of such vehicles to sleep in their cab. The passenger area of the truck may include convenience items such as a television, VCR, refrigerator, air conditioner, coffee maker, even a microwave oven. While such items may run on direct current provided by an engine mounted alternator, or even alternating current by use of an inverter, the truck engine must be running. Idling laws now prohibit the running of the main engine for prolong periods of time. However, the time and cost savings of keeping the driver near the vehicle while at rest are obvious and ancillary benefits include security as the operator does not leave the vehicle unattended.

A problem with the use of auxiliary generators is directed to size, weight, and placement. The size of an auxiliary generator is critical for if the overall dimensions are too large, there will be insufficient areas on a truck for which to place the auxiliary generator. For instance, it is not possible to place an auxiliary engine within the existing main engine compartment. Placement of an auxiliary engine on the frame rails is a known alternative, however conventional auxiliary generators employ baseplates making the size, weight, and subsequent placement a problem.

Generators also have a problem with vibration caused by misalignment. Installations commonly address misalignment by mounting the engine and the generator set on a heavy baseplate, the total weight of which may easily approach 500 lbs. By mounting both units on a baseplate the misalignment of the belt drive between the engine and generator is prevented. However, the mounting of a generator and an engine on a baseplate results in a large usage of space due to the separation between the components.

The use of gasoline engines to power a generator is also well known. Gasoline engines are lighter in weight and smaller in size when compared to a diesel engine of the same horsepower. However, gasoline is a very volatile fuel and when a gasoline engine is placed into the confines of a container or step box, the gasoline engine must be made either "spark proof" or it will present a lethal environment that can create an explosion. Further, when used on a diesel powered tractor trailer, a separate fuel tank is required and grounding becomes critical since any stray spark can ignite gasoline.

The Applicant is a well known assembler of diesel engine/generators packages and has been awarded patents for various arrangements. U.S. Pat. Nos. 6,047,942 and 5,765,805 granted to the Applicant disclose the use of a combination engine/generator that is lightweight and of a novel space saving configuration.

Thus what is found lacking in the art is a low profile generator set that employs a diesel engine in a configuration that minimizes space, weight, vibration and includes an installation mount integrating the generator set with a diesel powered tractor trailer.

DESCRIPTION OF THE PRIOR ART

An integral engine generator set that may be used in this invention is disclosed in U.S. Pat. No. 5,765,805 to G. W. Kennedy, the inventor here. The disclosure of this patent is incorporated herein by reference.

The integral engine generator set described in the patent utilizes a bracket interposed between the engine and generator for direct coupling of the components. The inspection plate of the engine is replaced by the bracket and the generator is bolted to the other side of the bracket. The bracket eliminates the need for a common baseplate and a belt tensioner. The engine and bracket may have isolation mounts for support or the engine, alone, may be mounted to the vehicle.

Base plates for motors are old and well known in the prior art as exemplified by U.S. Pat. No. 2,662,988. Also, mounting brackets are conventional as shown by Credle, Jr. in U.S. Pat. No. 4,441,684.

SUMMARY OF THE INVENTION

The instant invention is a unitary combination engine generator set combined with a support housing that is incorporated into the design of the vehicle in which it is mounted.

The instant invention is an engine/generator assembly designed specifically for semi-truck tractor trailer applications. The assembly employs a rigid integral diesel engine/generator with a synchronized belt drive therebetween. The assembly is positionable within an enclosure by employing a horizontally disposed engine providing a low profile and securing the assembly within an enclosure to the chassis of the truck, in a similar manner as an auxiliary fuel tank.

An objective of this invention is to provide a diesel engine/generator set having a very low profile for placement within an existing compartment of a vehicle.

Another objective of this invention is to provide a diesel engine/generator set that is positionable within a conventional low profile step securable to a truck chassis.

Still another objective of this invention is to provide a storage container for an auxiliary generator that conceals the contents from theft and adverse environmental conditions.

Another objective of this invention is to provide a low profile mount for a diesel engine/generator set that minimizes vibration in the support vehicle.

Yet another objective of this invention is to provide a low profile mount which permits easy access to the engine and generator set.

Yet still another objective of this invention is to provide a generator storage box that further operates as a step.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objectives and features thereof.

DETAILED DESCRIPTION OF THE INVENTION

Figure 1:
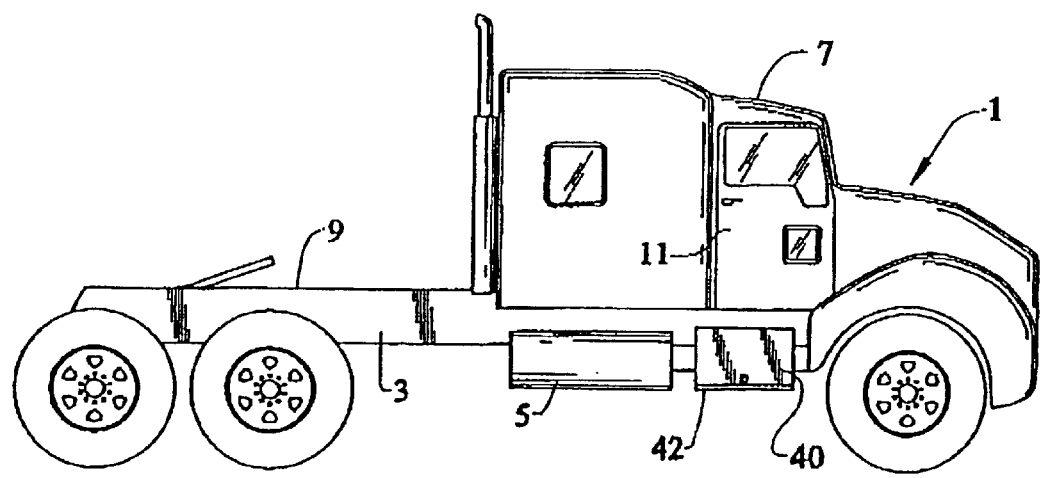
FIG. 1 is a perspective view of the low profile generator mount installed on a large truck.
Figure 2:
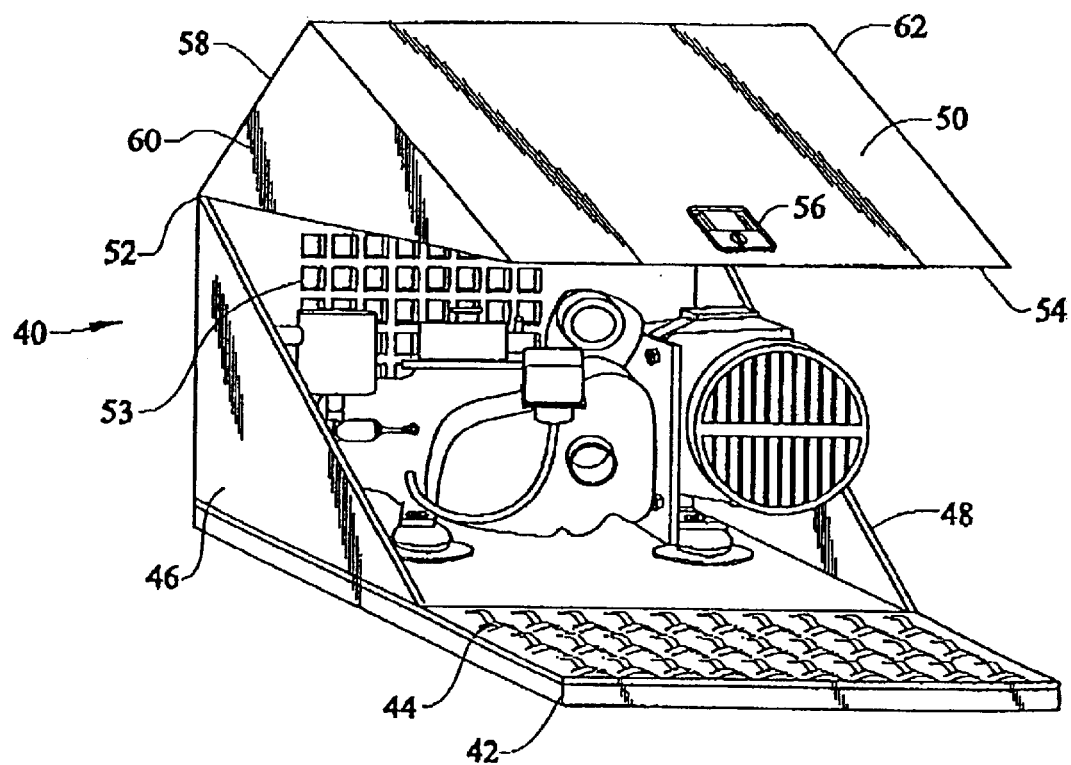
FIG. 2 is a perspective of the diesel engine/generator set.

Now referring to FIGS. 1 and 2 which shows an illustration of a large truck 1 having a chassis, or frame, in which an external fuel tank 5 is typically mounted between the cab 7 and the truck bed 9 or trailer, not shown. The size and height of the truck normally requires steps located beneath the door 11 to gain entry to the cab 7. In some truck designs, the steps are faired into the external fuel tanks for aesthetics and aerodynamics. In other designs the tanks are behind the doors of the cab and the steps are separate.

In the first embodiment, the generator set of the instant invention is incorporated within a box 40 or step structure of the truck. The step structure 40 is made of metal attached to the truck frame 3 and extends below the frame. The step structure has a lower step 42, extending horizontally closest to the ground, with a non-slip surface 44 extending between side walls 46 and 48 at each end of the step. The side walls form an integral portion of the storage box 40 which is attached to the truck frame by bolts, welding, rivets, and the like. The step 42 may be attached to the brackets in the same manner or made from a single piece of metal further forming a platform for mounting of the generator within the storage box. The step 44 may be a solid planar metal sheet with a non-slip tread formed in the upper surface or an open mesh material. The step 42 extends outwardly from the enclosure sufficiently to provide a safe footing.

A vertical cover 50 is rotatably attached to the brackets by a hinge 52 at the upper edge. The cover forms the front wall of the enclosure. The lower edge 54 of the cover 50 may have a latch mechanism 56 to cooperate with the step 42 to releasably hold the cover 50 in place in the closed position. When closed, the cover forms the vertical riser between the lower step and the upper step. The height of the vertical riser is limited to the distance an average person can step, e.g. approximately 14 to 17 inches. The hinged cover 50 provides access to the generator set while providing protection for both the machinery and the operators. The upper surface 58 of the cover 50 may form a second step if necessary to provide egress into the cab 11. Another fixed vertical cover opposite the front wall forms the back wall 51 of the enclosure. The wall 51 has perforations 53 for ventilation. In one embodiment (not shown), a hinge may be at the lower edge of the side wall and the latch near the upper step. Alternatively, the top may be removable such as those found on Peterbilt trucks. In a preferred embodiment, the upper surface 58 of the enclosure is attached to the side walls 60 and 62 to form the upper step. Kenworth trucks typically include a hinged cover for storage boxes.

Figure 3:
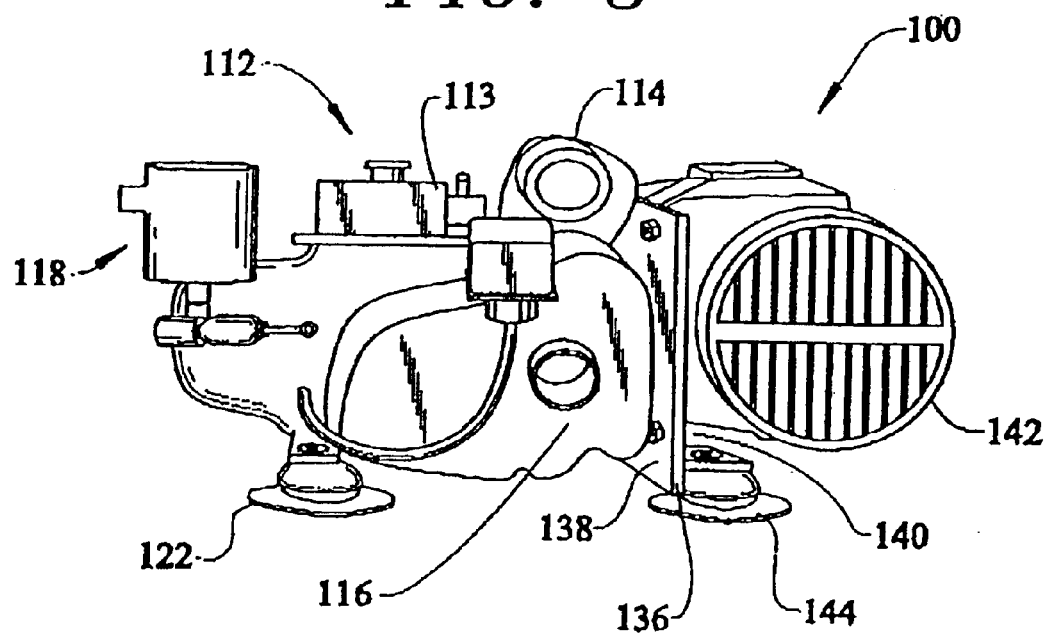
FIG. 3 is a perspective of the mount of FIG. 1 with the diesel engine/generator exposed.

Now referring to FIG. 3, there is shown a conventional diesel engine 100, such as manufactured by the Kubota Corporation, having a horizontally disposed cylinder 112 and an integral generator 142 located on opposite sides of the crank case 116. This orientation is necessary to accommodate the internal space requirements existing in the step 42. In this installation, the piston reciprocates parallel to the step surface 44.

The engine, shown in FIG. 3, is self contained having a radiator 113, starter 114, crank case 116, air cleaner 118, and fuel injections system (not shown). The crank case 116 includes isolation mounts 122 mounted to the crank case by the use of support brackets.

A support bracket 136 is constructed from an aluminum plate having a thickness of about ⅜ inch with a first side surface 138 securable to the engine and a second side surface 140 available for securing the generator 142. The bracket 136 may be through-bolted to the engine and generator or otherwise fixed to provide a rigid engine/generator set. A second set of isolation mounts 144 is secured to the bracket 136 providing a structure for mounting inside the storage box 40.

The low profile generator set has the approximate dimensions of 28 inches length, 17 inches height and 16 inches deep. The preferred engine 100 is a one cylinder liquid cooled Kubota diesel engine turning a generator of 3.5 kilowatts capacity at 120 volts and 30 amps. In another embodiment having a height approximately 14 inches, the engine radiator 113 and cooling fan 115 are located outside the enclosure and connected to the engine by the requisite hoses and wires, as shown in FIGS. 5 through 8. Hose and wire connections allowing the remote mounted radiator and/or fan are well known in the art and therefore a detailed description will be omitted. The radiator is secured to the enclosure wall by the use of isolation supports or rubber biscuits 111. The rubber biscuits 111 space the radiator apart from the enclosure a predetermined distance creating a relief space. The fan 115 is positioned outboard the radiator wherein the fan draws air from the relief space and through the radiator 113. In addition, the enclosure preferably includes a discharge opening or perforated back wall 51 wherein the fan draws air from the enclosure with the relief space providing additional air if the enclosure lacks sufficient air displacement. In this position, the fan serves the dual purpose of extracting heated air from the enclosure and providing air flow across the radiator. Alternatively, the generator engine can access the primary cooling system of the truck. In this arrangement, the radiator and fan can be removed and fluid circulated through the truck radiator system wherein by its shear volume may not require an auxiliary fan for cooling of the smaller engine coupled to the generator.

Figure 4:
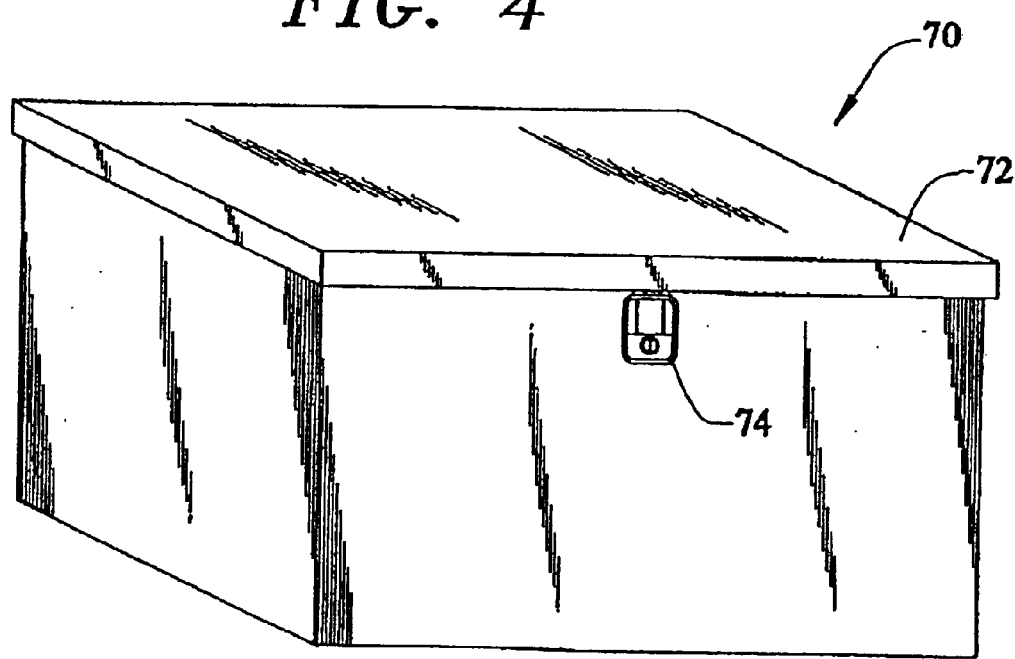
FIG. 4 is another embodiment of the low profile generator mount.
Figure 5:
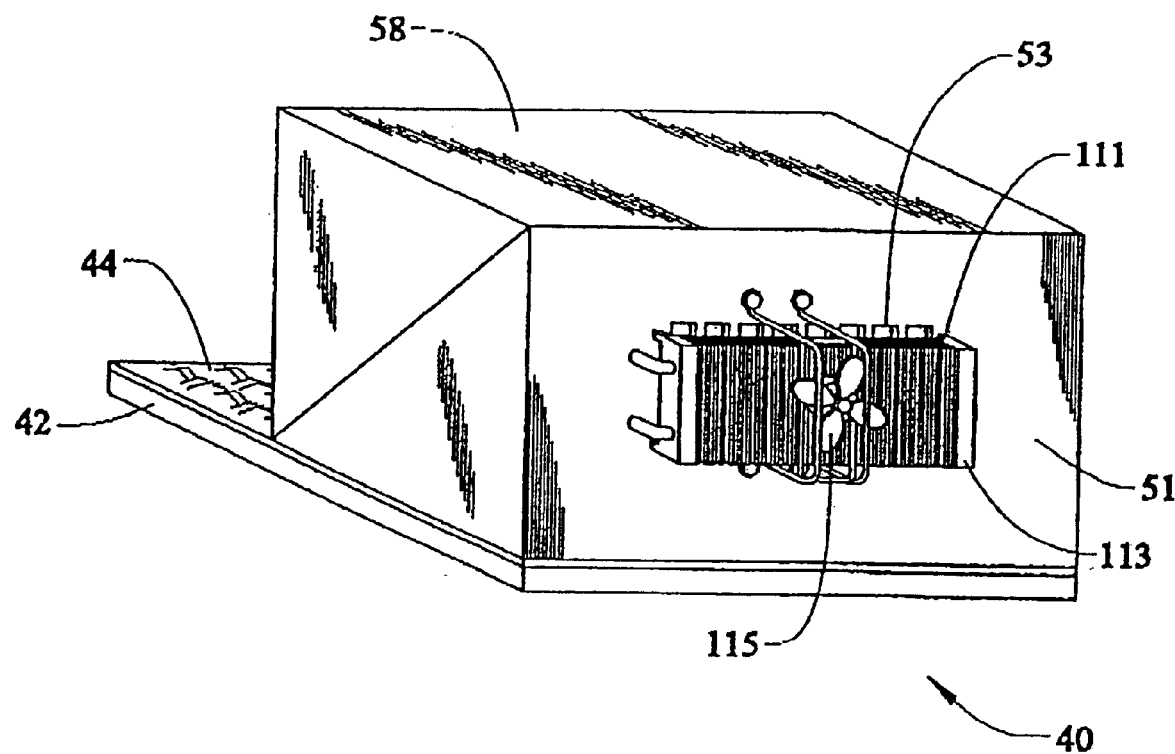
FIG. 5 is a prospective of the rear of the truck step.
Figure 6:
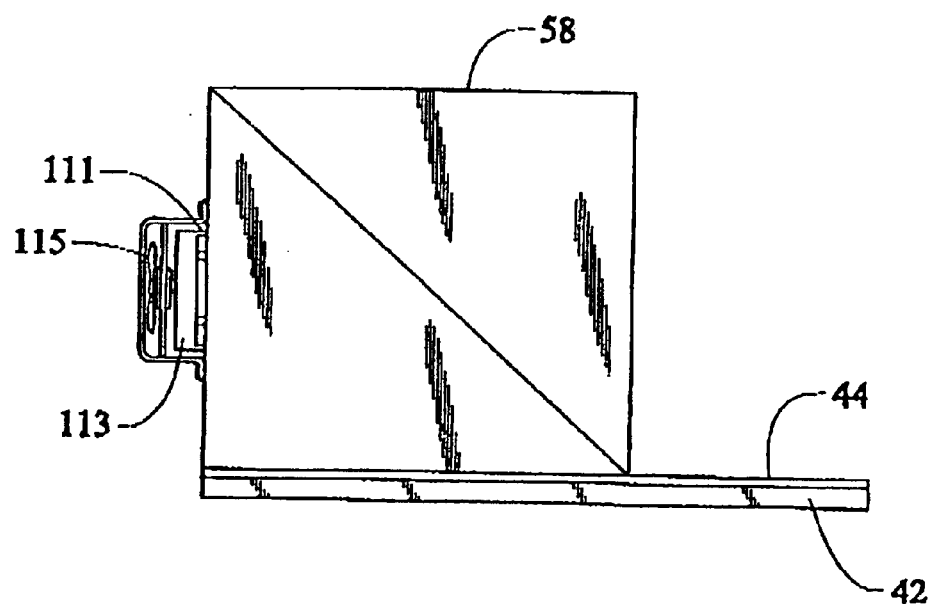
FIG. 6 is a side view of the truck step.
Figure 7:
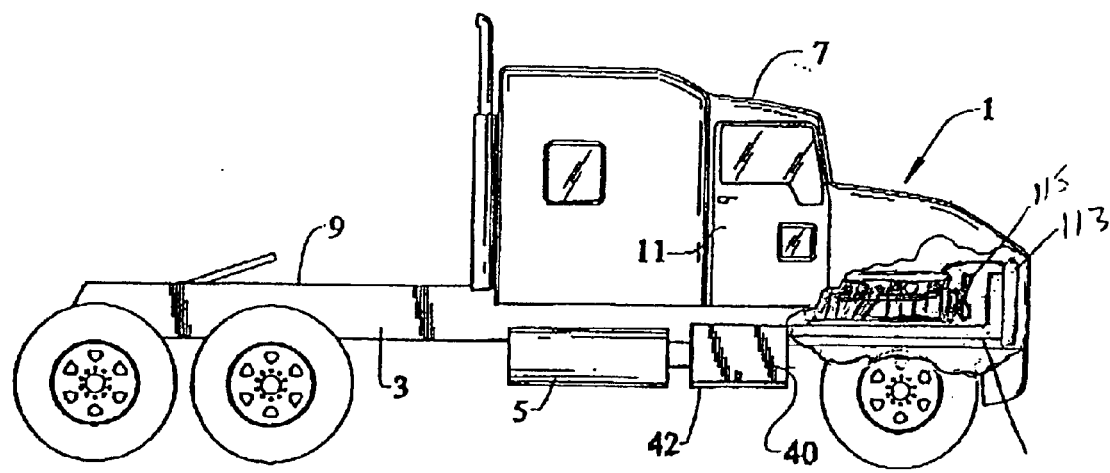
FIG. 7 is a side view partially in section illustrating the low profile generator coupled to the truck radiator for cooling purposes.
Figure 8:
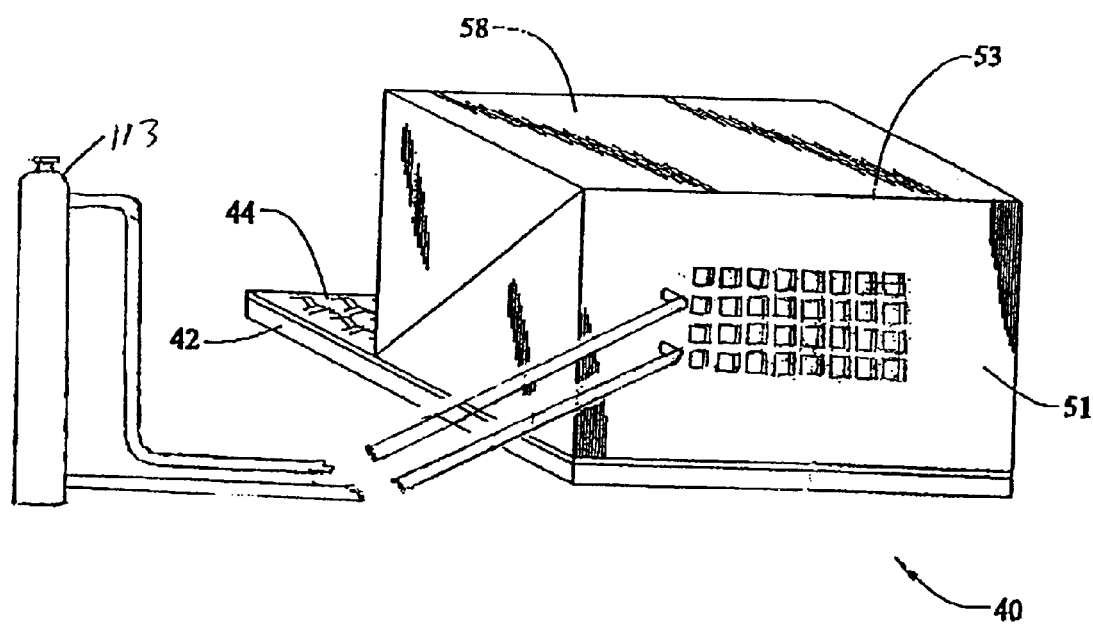
FIG. 8 is a partial perspective view illustrating the low profile generator coupled to a remote radiator.

FIG. 4 sets forth another embodiment wherein the generator set may be mounted in a box 70 having a hinged top 72. The box 70 would appear that of a conventional storage box found on trucks and may, or may not, operate as a step. The top 72 may be opened to gain access to the generator set rotating along a hinge and secured closed by a latch mechanism 74 to releasably connect the top step to the remainder of the box. In both embodiments of the enclosure, there is adequate ventilation to permit dissipation of heat and engine air intake.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An apparatus for securement of a low profile auxiliary generator to large vehicles, said large vehicle having a frame and entry doors for an operator, said apparatus functioning as a step when mounted on said frame below an entry door, said step comprising an enclosure having an interconnected floor parallel to and below said frame, opposite vertical side walls, opposite vertical end walls, and a top parallel to said floor, an integral engine/generator set fixed in said enclosure, said engine/generator set having a liquid cooled internal combustion engine rigidly connected to an electrical generator by a thin vertical planar bracket, said engine having at least one cylinder disposed parallel to said floor for turning said generator to produce electricity, said engine/generator set connected to a plurality of isolation mounts to reduce vibration, said isolation mounts fixed to said floor, one of said vertical side walls pivotally connected to said opposite vertical end walls by a hinge to provide access to said enclosure, said liquid cooled engine having a radiator and associated fan, said radiator and said fan mounted on a vertical wall outside said enclosure.

2. The apparatus according to claim 1 wherein the height of said vertical end walls and said vertical side walls is approximately 15 inches.

3. The apparatus according to claim 1 wherein said vertical wall is perforated and has a height of approximately 14 inches.

4. The apparatus according to claim 1 wherein said associated fan is located between said perforated wall and said radiator whereby said fan extracts heat from said enclosure and provides air flow across said radiator.

5. The apparatus according to claim 1 wherein said vertical end walls are hinged to said top.

6. The apparatus according to claim 5 wherein said vertical end walls are two piece constructions whereby operation of said hinge to provide access to said enclosure separates said two piece construction.

7. The apparatus according to claim 4 wherein said opposite side walls are fixedly interconnected with said opposite end walls and said top is hingedly connected to said box to provide access to said enclosure.

8. The apparatus according to claim 1 wherein said top is a removable cover.

9. The apparatus according to claim 1 wherein said floor extends beyond said side walls forming a planar step.

10. The apparatus according to claim 1 wherein said integral engine is a horizontally disposed one cylinder liquid cooled Kubota diesel engine.

11. The apparatus according to claim 1 wherein said liquid cooled engine is coupled to a truck radiator for cooling purposes.

12. An apparatus for securement of a low profile auxiliary generator to large vehicles having a frame, said apparatus functioning as an auxiliary engine enclosure when mounted on said frame, said enclosure having an interconnected floor parallel to said frame, opposite vertical side walls, opposite vertical end walls, and a top parallel to said floor, an integral engine/generator set fixed in said enclosure, said set having a liquid cooled internal combustion engine rigidly connected to an electrical generator by a thin vertical planar bracket, said engine having at least one cylinder disposed parallel to said floor for turning said generator to produce electricity, said set connected to isolation mounts to reduce vibration, said isolation mounts fixed to said floor, said liquid cooled engine having a radiator and associated fan, said radiator and said fan mounted outside said enclosure.

13. The apparatus according to claim 12 wherein the height of said vertical end walls and said vertical side walls is approximately 15 inches.

14. The apparatus according to claim 12 wherein at least one of said vertical walls is perforated for discharging hot air and exhaust from said low profile generator set.

15. The apparatus according to claim 14 wherein said radiator is located between said at least one perforated wall and said associated fan whereby said fan extracts heat from said enclosure and provides air flow across said radiator.

16. The apparatus according to claim 12 wherein a hinge couples to said opposite vertical end walls along said vertical side wall and said top whereby operation of said hinge provides access to said enclosure.

17. The apparatus according to claim 16 wherein said vertical end walls are two piece constructions whereby operation of said hinge to provide access to said enclosure separates said two piece construction.

18. The apparatus according to claim 16 wherein said opposite side walls are fixedly interconnected with said opposite end walls and said top is hingedly connected to said box to provide access to said enclosure.

19. The apparatus according to claim 12 wherein said large vehicle is a truck and said liquid cooled diesel engine of said low profile generator set is coupled to said truck's radiator for cooling purposes.

* * * * *